(12) United States Patent
Stoops (10) Patent No.: US 10,642,374 B2
(45) Date of Patent: May 5, 2020

(54) KEYBOARD/KEYBOARD ENCLOSURE (71) Applicant: Kevin R. Stoops, Bucyrus, KS (US)

(72) Inventor: Kevin R. Stoops, Bucyrus, KS (US)

( * ) Notice: Subject to any disclaimer, the term of this patent is extended or adjusted under 35 U.S.C. 154(b) by 0 days.

(21) Appl. No.: 16/505,476

(22) Filed: Jul. 8, 2019

(65) Prior Publication Data
US 2019/0332187 A1 Oct. 31, 2019

Related U.S. Application Data (63) Continuation of application No. 15/599,400, filed on May 18, 2017, now Pat. No. 10,345,920.
(60) Provisional application No. 62/338,428, filed on May 18, 2016, provisional application No. 62/508,048, filed on May 18, 2017.

(51) Int. Cl.
*G06F 3/02* (2006.01)
*H01H 13/702* (2006.01)

(52) U.S. Cl.
CPC .......... *G06F 3/0219* (2013.01); *G06F 3/0202* (2013.01); *H01H 13/702* (2013.01)

(58) Field of Classification Search
None
See application file for complete search history.

(56) References Cited

U.S. PATENT DOCUMENTS

| | | | |
|---|---|---|---|
| 3,613,044 A | 10/1971 | Rarick | |
| 3,773,969 A | 11/1973 | Geisel | |
| 3,792,414 A | 2/1974 | Smith | |
| 4,476,462 A | 10/1984 | Feldman | |
| 4,542,442 A * | 9/1985 | Drexler | .......... H05K 7/18 361/784 |
| 4,948,281 A | 8/1990 | Werner | |
| 5,110,228 A | 5/1992 | Yokomizo | |
| 5,144,302 A | 9/1992 | Carter et al. | |
| 5,237,487 A | 8/1993 | Dittmer et al. | |
| 5,403,207 A | 4/1995 | Briones | |
| 5,982,357 A | 11/1999 | Burgett et al. | |
| 6,259,044 B1 | 7/2001 | Paratore et al. | |
| 6,365,848 B1 | 4/2002 | Maple | |
| 6,580,799 B1 | 6/2003 | Azima et al. | |
| 6,685,369 B2 | 2/2004 | Lien | |
| 6,686,908 B1 | 2/2004 | Kobayashi | |
| 6,705,787 B2 | 3/2004 | Jeffries et al. | |
| 6,727,890 B2 | 4/2004 | Andres et al. | |

(Continued)

OTHER PUBLICATIONS

Final Office Action received for U.S. Appl. No. 15/599,400, dated Aug. 30, 2018, 13 pages.

(Continued)

*Primary Examiner* — Xanthia C Cunningham
(74) *Attorney, Agent, or Firm* — Kutak Rock LLP (57) ABSTRACT

A keyboard/keyboard enclosure is provided. The keyboard/keyboard enclosure includes front and rear shells removably connected together and made of a durable metal material such as aluminum. The enclosure defines a cavity and various features for positioning and/or restraining a PCB within the cavity. A keypad is positioned on the front surface of the front shell. End caps extend into the cavity from opposed ends of the front and rear shells, thereby selectively securing the front and rear shells together and/or further positioning and/or restraining the PCB within the cavity.

20 Claims, 10 Drawing Sheets

(56) References Cited

U.S. PATENT DOCUMENTS

| | | | |
|---|---|---|---|
| 6,765,158 B1* | 7/2004 | Morrison | H01H 13/70 200/341 |
| D516,079 S | 2/2006 | Solomon et al. | |
| 7,012,206 B2* | 3/2006 | Oikawa | H01H 13/063 200/302.1 |
| 7,038,598 B2 | 5/2006 | Uke | |
| 7,091,955 B2 | 8/2006 | Kramer | |
| D540,396 S | 4/2007 | Kawanobe et al. | |
| 7,393,149 B2* | 7/2008 | Galeev | G06F 3/0219 400/472 |
| D594,008 S | 6/2009 | Doczy et al. | |
| D613,745 S | 4/2010 | Arbisi et al. | |
| 7,787,912 B2* | 8/2010 | Saila | H04M 1/0216 455/550.1 |
| 7,997,770 B1* | 8/2011 | Meurer | F21K 9/272 362/171 |
| 8,046,032 B2 | 10/2011 | Babella | |
| D664,960 S | 8/2012 | Stoops | |
| 8,773,864 B2* | 7/2014 | Rapp | H05K 7/1434 361/752 |
| 9,016,965 B1 | 4/2015 | Stoops et al. | |
| D746,122 S | 12/2015 | Stoops | |
| 9,706,025 B2* | 7/2017 | Ikeda | H04M 1/0285 |
| 10,345,920 B2 | 7/2019 | Stoops | |
| 2003/0044000 A1 | 3/2003 | Kfoury et al. | |
| 2003/0078014 A1 | 4/2003 | Salminen et al. | |
| 2003/0108374 A1* | 6/2003 | Lien | G06F 3/0202 400/472 |
| 2004/0013456 A1 | 1/2004 | Hochgesang et al. | |
| 2004/0136167 A1* | 7/2004 | Sullivan | G06F 1/1613 361/728 |
| 2004/0207976 A1* | 10/2004 | Hamada | G06F 1/1613 361/679.08 |
| 2005/0083307 A1 | 4/2005 | Aufderheide et al. | |
| 2006/0159506 A1 | 7/2006 | Cheng et al. | |
| 2007/0041770 A1* | 2/2007 | Galeev | G06F 3/0219 400/472 |
| 2007/0099675 A1 | 5/2007 | Silverbrook | |
| 2007/0235309 A1 | 10/2007 | Tsu | |
| 2007/0290889 A1 | 12/2007 | Wiley | |
| 2008/0085142 A1 | 4/2008 | Caveney et al. | |
| 2008/0297994 A1 | 12/2008 | Shi | |
| 2008/0309633 A1 | 12/2008 | Hotelling et al. | |
| 2009/0167287 A1 | 7/2009 | Van Meijl et al. | |
| 2009/0174994 A1* | 7/2009 | Merz | G06F 1/1624 361/679.09 |
| 2010/0253552 A1 | 10/2010 | Lanceros Mendez et al. | |
| 2010/0302168 A1* | 12/2010 | Giancarlo | G06F 1/1662 345/169 |
| 2011/0017524 A1 | 1/2011 | Chen et al. | |
| 2011/0095918 A1 | 4/2011 | Kim et al. | |
| 2011/0203913 A1* | 8/2011 | Chen | H01H 13/702 200/5 A |
| 2012/0032821 A1* | 2/2012 | Senatori | G06F 1/1662 341/22 |
| 2012/0050076 A1* | 3/2012 | Ku | G06F 3/0219 341/22 |
| 2012/0111173 A1* | 5/2012 | Bowen | G10H 1/34 84/170 |
| 2012/0113013 A1* | 5/2012 | Lee | G06F 3/0202 345/170 |
| 2015/0077330 A1* | 3/2015 | Okabe | G06F 3/023 345/156 |
| 2015/0211688 A1* | 7/2015 | Shan | F21K 9/27 362/221 |
| 2015/0220161 A1* | 8/2015 | Ryabchenko | G06F 3/0216 345/169 |
| 2016/0378199 A1* | 12/2016 | Sizelove | B64D 11/00155 341/22 |
| 2017/0108180 A1* | 4/2017 | Lee | F21V 29/89 |
| 2017/0336875 A1 | 11/2017 | Stoops | |
| 2018/0068811 A1* | 3/2018 | Ligtenberg | H01H 13/86 |

OTHER PUBLICATIONS

Non-Final office Action received for U.S. Appl. No. 15/599,400, dated Jan. 9, 2018, 16 pages.
Notice of Allowance received for U.S. Appl. No. 12/849,009 dated Feb. 23, 2015, 7 pages.
Corrected Notice of Allowance received for U.S. Appl. No. 15/599,400 dated Apr. 23, 2019, 6 pages.
Ex Parte Quayle Action received for U.S. Appl. No. 29/385,677 dated Dec. 29, 2011, 6 pages.
Final office action received for U.S. Appl. No. 12/849,009 dated Mar. 15, 2013, 16 pages.
Non-Final office action received for U.S. Appl. No. 12/849,009 dated Jul. 30, 2014, 15 pages.
Non-Final office action received for U.S. Appl. No. 12/849,009 dated May 15, 2012, 11 pages.
Notice of Allowance received for U.S. Appl. No. 29/385,677 dated Mar. 19, 2012, 7 pages.
Notice of Allowance received for U.S. Appl. No. 15/599,400, dated Feb. 19, 2019, 10 pages.
Supplemental Notice of Allowance received for U.S. Appl. No. 29/385,677 dated Jun. 26, 2012, 2 pages.

\* cited by examiner

KEYBOARD/KEYBOARD ENCLOSURE

CROSS-REFERENCE TO RELATED APPLICATIONS

This application is a continuation application of U.S. patent application Ser. No. 15/599,400, filed May 18, 2017, now U.S. Pat. No. 10,345,920, which claims priority pursuant to 35 U.S.C. 119(e) to U.S. Provisional Patent Application Ser. Nos. 62/338,428, filed May 18, 2016, and 62/508,048, filed May 18, 2017, the entire disclosures of which are incorporated herein by reference.

FIELD OF THE INVENTION

The present invention relates generally to computer user interfaces. More specifically, the present invention relates to a keyboard/keyboard enclosure particularly well-suited for use in quick serve restaurant environments.

BACKGROUND OF THE INVENTION

Quick serve restaurants utilize many computers for purposes such as inputting orders at the counter, for completing food orders in the kitchens. Many of the computers include a PS/2, serial, USB or other similar style input interface. The input interface (keyboard) typically includes a small number of keys (compared to a QWERTY keyboard) that includes letters, numbers, symbols or words associated with certain functions of the computer (i.e. inputting a customer's order, inputting completion of the order by a kitchen staff person, etc.). As commercial kitchen environments are typically extremely harsh due to high temperatures, corrosive substances (foods, liquids, etc.), employee usage/abuse, etc., the computer input interface devices are subjected to significant wear and tear.

Many of the input interface devices of the prior art typically includes a two-piece metal enclosure shell (front shell half and rear shell half) for a printed circuit board (PCB). The printed circuit board includes connectors for a PS/2 cable that connects to a computer, and for a ribbon cable that connects to a keypad membrane that is mounted to the outer surface of the enclosure. The PS/2 cable extends out a slot in the enclosure and is connected to the computer. To install (or reinstall/replace) the PS/2 cable it is required to disassemble the two halves of the enclosure shell and insert the cable into the slot in the side of one of the halves of the shell. Due to the design of the metal enclosure, this is a time consuming process, and can result in damage to the PCB. To overcome disadvantages with the prior art metal enclosures, the instant inventor developed the keyboard/keyboard enclosure of U.S. Pat. No. 9,016, 965 (the "'965 Patent"), the entire disclosure of which is incorporated herein by reference. The keyboard enclosure of embodiments of the '965 Patent includes a front shell portion and a rear shell portion, each made of nylon 6. While the keyboard/keyboard enclosure of the '965 Patent provides many advantages to the metal enclosures of the prior art, many restaurants still prefer a metal enclosure, due to a perception that metal is more durable than nylon.

Therefore, it is desirable to provide a metal keyboard/keyboard enclosure that is easy to assemble/disassemble.

SUMMARY OF THE INVENTION

The instant invention provides a metal keyboard/keyboard enclosure that is easy to assemble/disassemble. The enclosure portion includes a front metal member and a back metal member that slide-fit together via an interlocking tongue and groove structure. In a preferred embodiment, the metal front and back are made of aluminum. End caps are located on each end of the joined front and back members to complete the enclosure. In a preferred embodiment, the end caps are made of a nylon material. In some embodiments, the end caps include a knock-out area to allow a ribbon cable for a keypad membrane that is positioned on the exterior surface of the metal front to be extended through the end cap into the interior of the enclosure to a PCB located within the enclosure. In some embodiments, the end cap includes receiver structure to support the PCB located within the enclosure.

In some embodiments of the inventive concept, the keypad can be programmed with "macros" that are stored on the PCB. In this manner, an app on a computer or other device is utilized to program the macros. The keypad is connected to the computer and instructions are uploaded to the keypad to store a series of characters that are stored in connection with each key. In this manner, once the keypad is programmed and connected to a computer for use, when a user presses a key the series of characters stored on the PCB will be sent from the keypad to the computer to which it is connected.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1 through 7 a keyboard enclosure 10 of a first embodiment of the instant invention is shown. The keyboard enclosure of the first embodiment includes a front shell portion 12 and a rear shell portion 14, each of which is preferably made of a lightweight, durable material, such as aluminum.

The front 12 and rear 14 shells are configured for selective engagement with each other, thereby defining a cavity 200 for holding one or more PCB 20. In some embodiments, the keyboard enclosure 10 further includes one or more end cap 300, such as a common end cap, a cable end cap, a battery end cap, or the like. In some embodiments, a first end cap 300 is configured to selectively engage with a first end of the keyboard enclosure 10, thereby selectively enclosing the one or more PCB within the cavity 200.

In some embodiments a profile of a first end of the front shell 12 defines at least part of a pass-through slot 15 for a ribbon cable 32 of a keypad 30 to extend. In some such embodiments, a first edge of the pass-through slot is defined by the front shell and an opposed second edge of the pass-through slot is defined by an end cap 300. In this way, the ribbon cable 32 is secured within the pass-through slot 15 when the end cap is secured to the front shell 12 and can be readily moved into and out of the pass-through slot 15 when the end cap is disengaged from the front cap 12. In some embodiments, at least part of the pass-through slot 15 is defined by the end cap 300. In this way, more or less clearance for one or more ribbon can be provided by replacing a first end cap with a second end cap.

In some embodiments, the front shell 12, the back shell 14, and/or one or more end cap defines one or more speaker hole 17 extending into the cavity 200 of the keyboard enclosure 10. In this way, sound is allowed to pass through the speaker holes 17 from a speaker mounted to the PCB 20 or otherwise located within the interior cavity 200 of the keyboard enclosure 10.

The PCB 20 is configured to selectively engage with the first shell 12, the second shell 14, and/or one or more end cap 300 so as secure the PCB within the cavity 200 of the keyboard enclosure 10. In some embodiments, the first shell 12 defines opposed longitudinal slots for selective engagement with opposed longitudinal edges of the PCB 20. In this way, the PCB 20 is capable of selective engagement with the first shell 12 by inserting first ends of the opposed edges of the PCB into respective slots of the front shell 12 and sliding the PCB 20 longitudinally relative to the first shell 12. In some such embodiments, one or more indexing feature 121 of the enclosure 10 provides an indication of when the PCB 20 is moved into a proper position. In other such embodiments, one or more feature of the enclosure, such as one or more feature of an end cap 300, is configured to selectively retain the PCB at one or more position.

Figure 1:
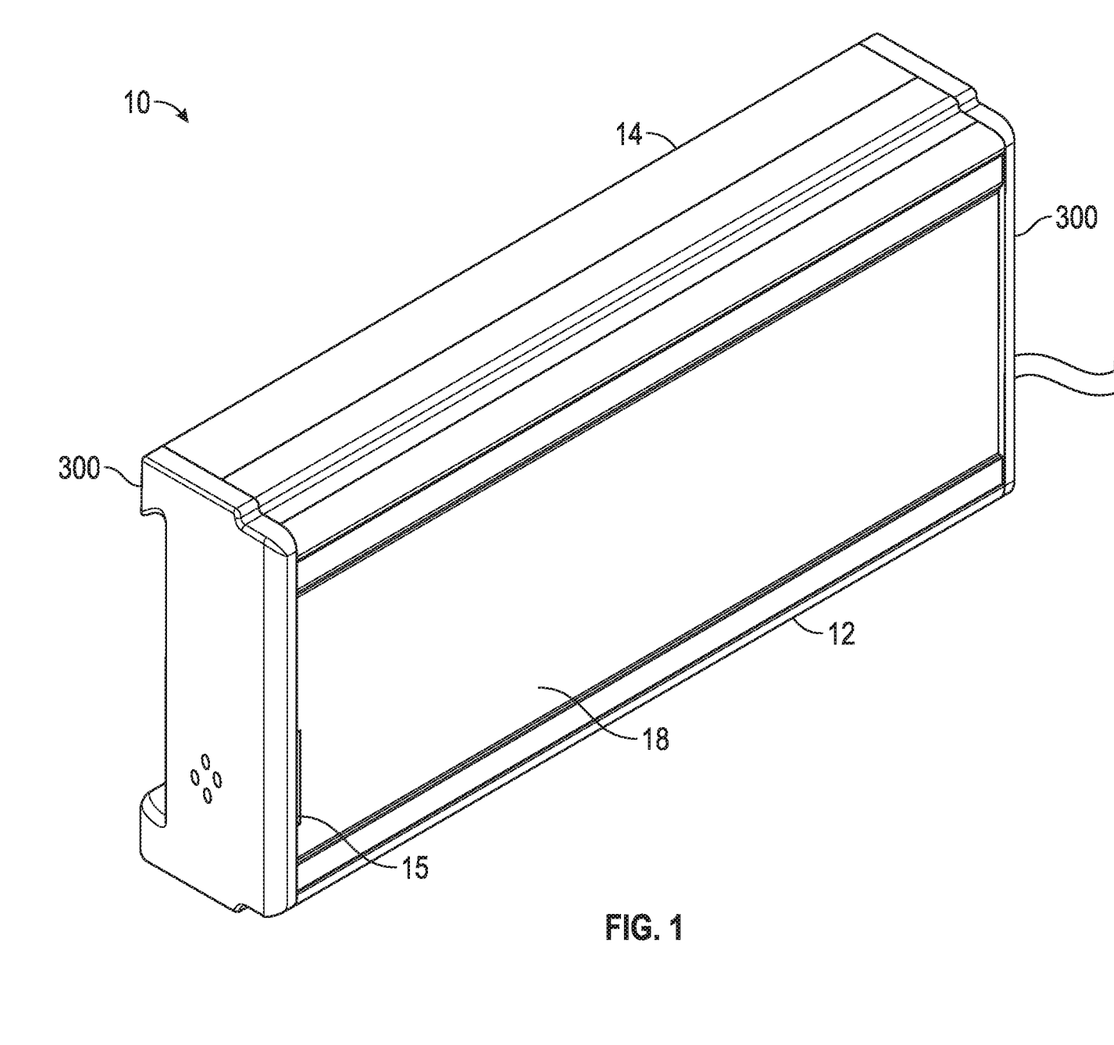
FIG. 1 is a front isometric view of a keyboard enclosure of an embodiment of the present invention.
Figure 2:
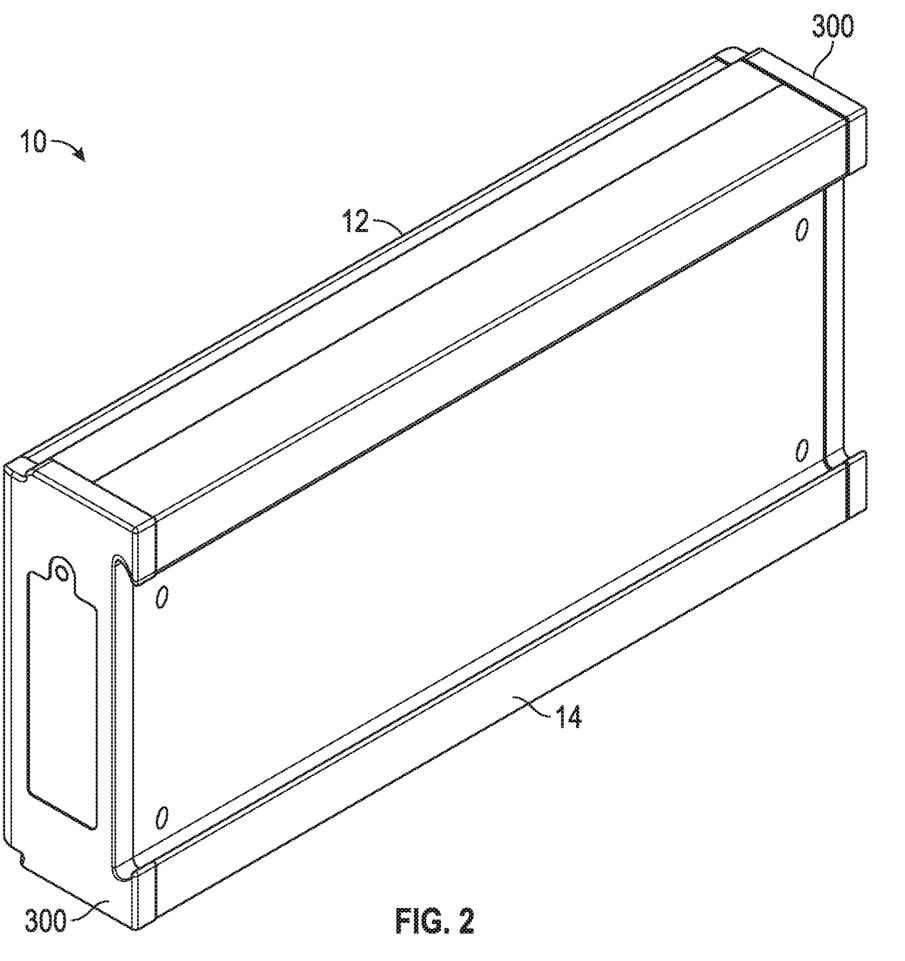
FIG. 2 is a rear isometric view of a keyboard enclosure of an embodiment of the present invention.
Figure 3:
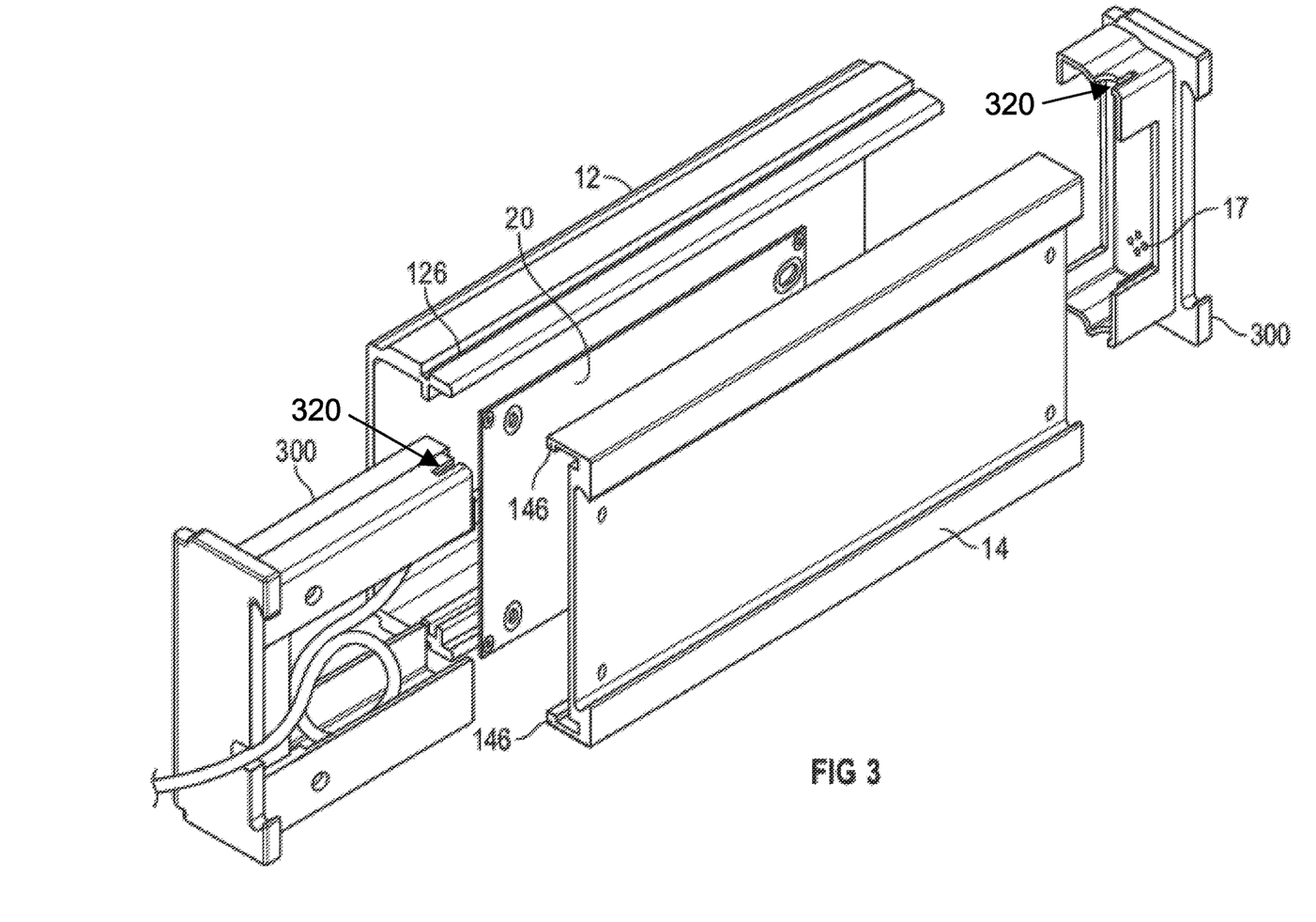
FIG. 3 is an exploded rear perspective view of an embodiment of the present invention.
Figure 4:
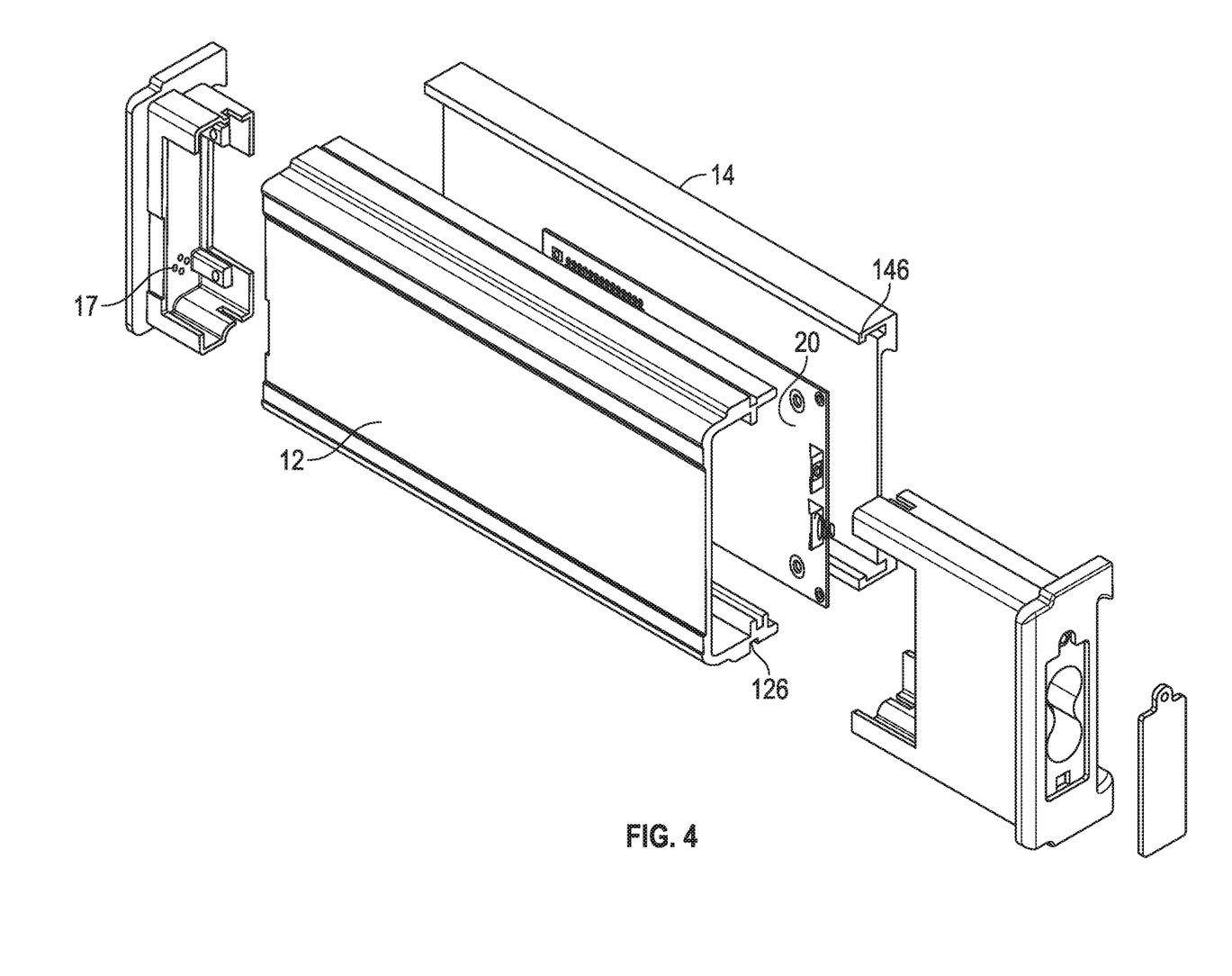
FIG. 4 is an exploded front perspective view of an embodiment of the present invention.
Figure 5:
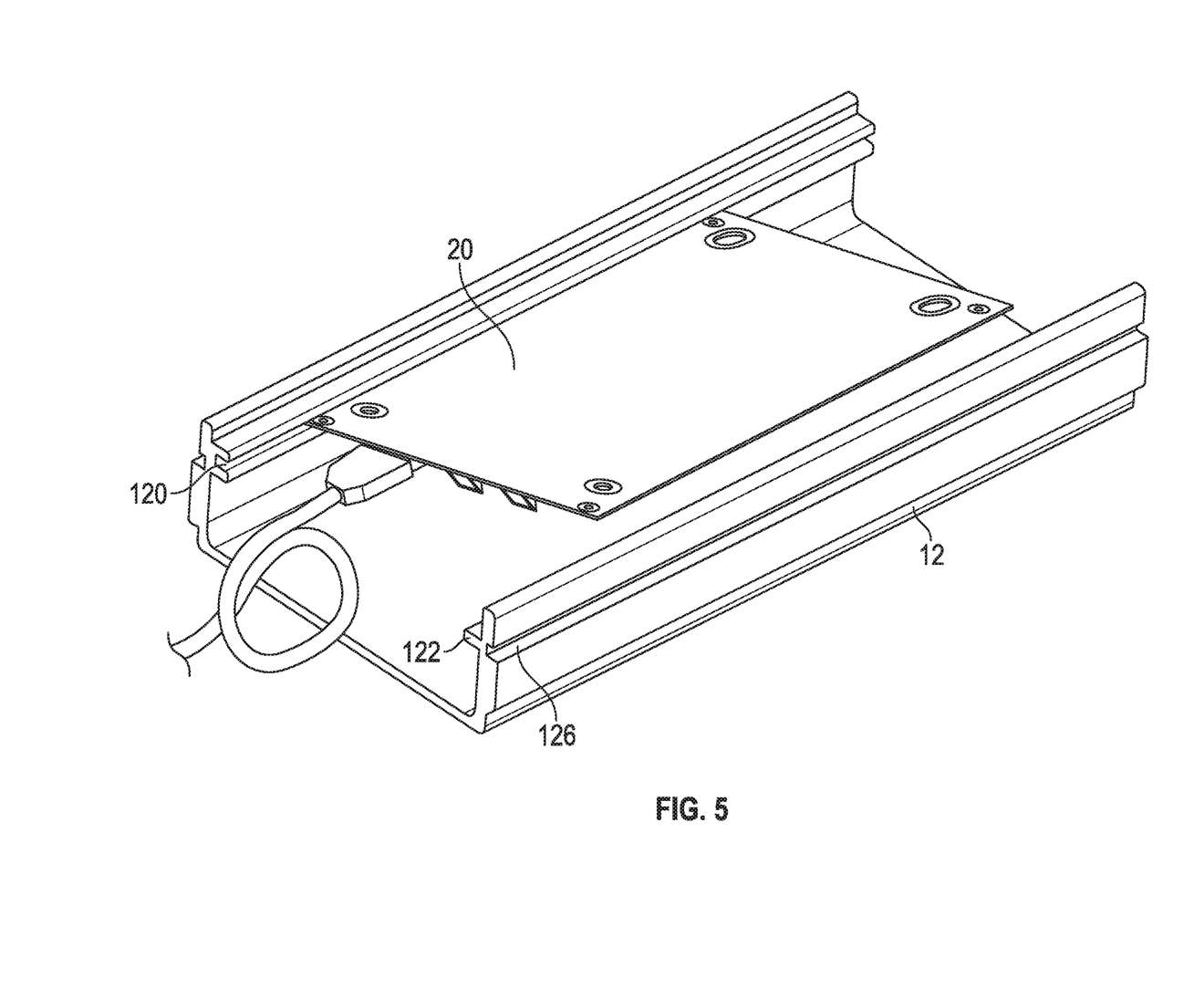
FIG. 5 is a perspective view of a first longitudinal edge of a PCB engaged with a longitudinal slot of a front shell of an embodiment of the present invention.

Referring to FIG. 5, some embodiments of the first shell 12 define a longitudinal slot 120 and an opposed longitudinal ledge 122. In some such embodiments, the opposed slot 120 and ledge 122 are configured to interface with opposed first and second longitudinal edges of a PCB 20, respectively. In this way, the first longitudinal edge of the PCB 20 is capable of selective engagement with the longitudinal slot 120, thereby allowing the second longitudinal edge of the PCB 20 to be rotated into selective engagement with the longitudinal ledge 122. In some such embodiments, the first shell 12 includes one or more indexing feature 121, such as a notch, associated with one or more indexing feature 21 of the PCB 20, such as a light emitting diode, a speaker, or other feature of, extending from, or engaging with the PCB 20. In this way, the PCB 20 can be positioned longitudinally relative to the first shell 12 prior to rotating the PCB into position. In some embodiments, one or more feature of the enclosure 10 is configured to selectively prevent the PCB from sliding along the longitudinal slot 120 and/or from rotating away from the longitudinal ledge 122. In some such embodiments, the rear shell 14 includes a longitudinal ledge (not shown) that is configured to selectively engage with the second edge of the PCB 20 so as to prevent the PCB from rotating away from the longitudinal ledge 122 of the first shell 12. In this way, the PCB is at least partially secured within the interior cavity 200 of the enclosure 10 when the rear shell 14 is secured to the front shell 12.

Figure 6:
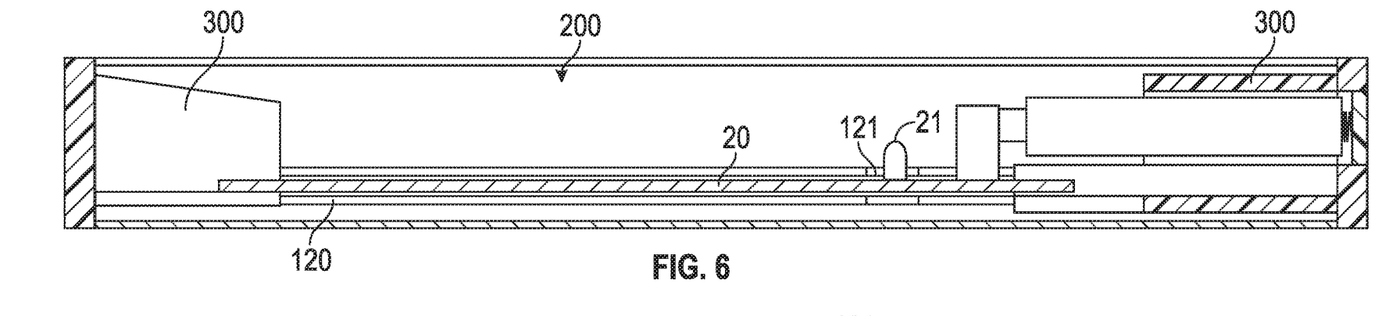
FIG. 6 is a sectional view showing a PCB engaged with end caps of an embodiment of the present invention.
Figure 7:
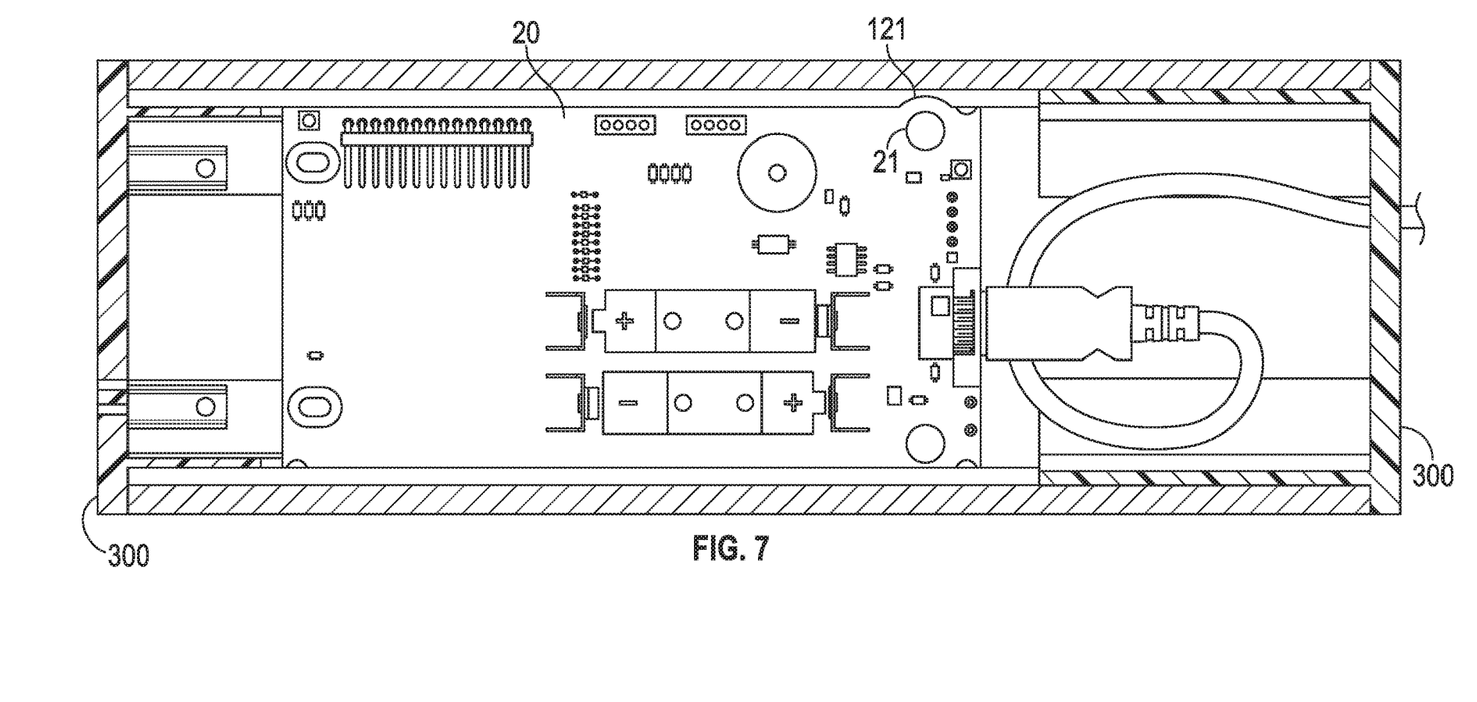
FIG. 7 is a sectional view showing an indexing feature of a PCB engaged with an indexing feature of a front shell of an embodiment of the present invention.
Figure 8:
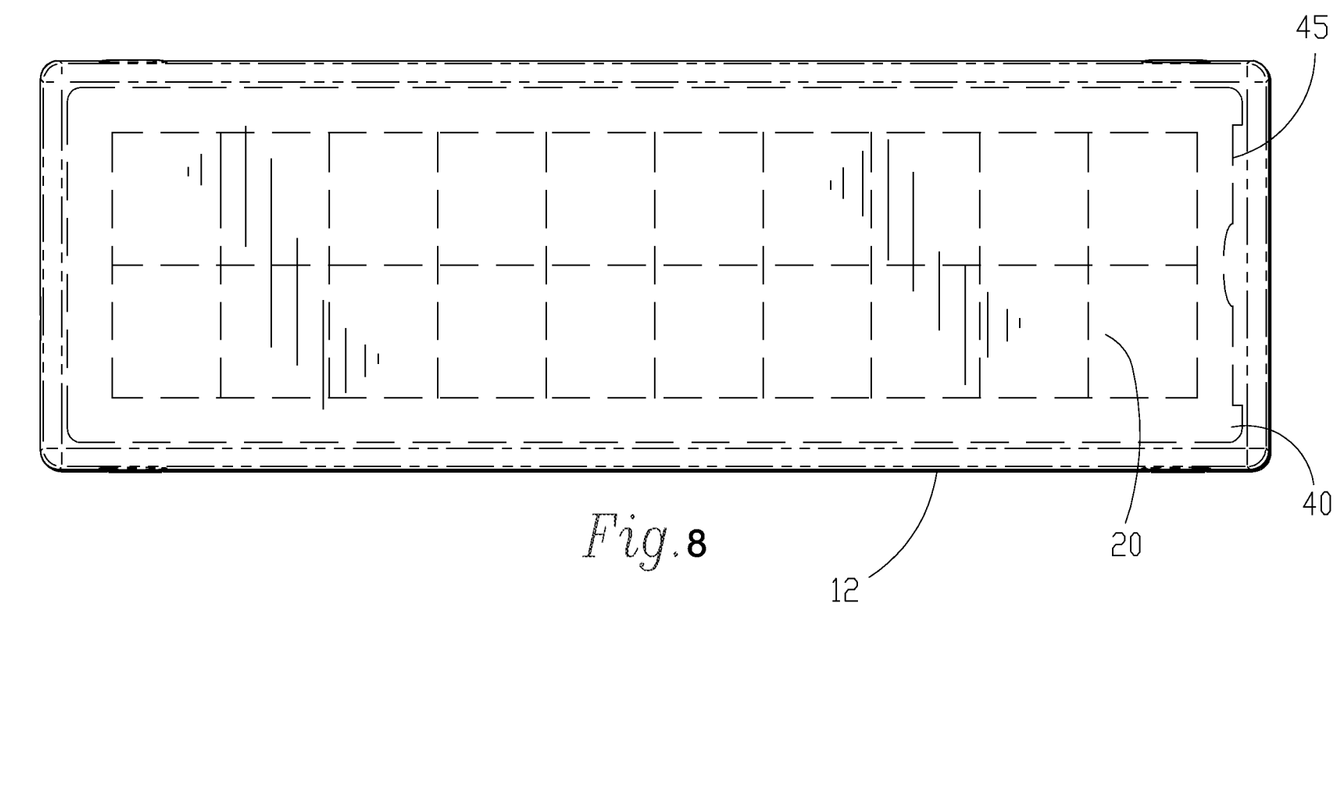
FIG. 8 is a front view of a keyboard enclosure of an embodiment of the present invention with a keyboard overlay positioned on a front surface of the enclosure.

In some embodiments, a first end cap 300 is configured to extend into the interior cavity 200 of the enclosure 10 when the first end cap 300 is secured to a first end of the enclosure 10. In some such embodiments, a distal end of the first end cap 300 defines one or more slot 320 for selective engagement with a first end of the PCB 20. In this way, the first end cap 300 is capable of preventing or otherwise inhibiting the PCB from moving longitudinally towards the first end of the enclosure 10. In some such embodiments, a distal end of a second end cap 300 is configured to selectively engage with a second end of the PCB 20 so as to similarly prevent or otherwise inhibit the PCB from moving longitudinally towards a second end of the enclosure 10. In other such embodiments, one or more feature of the front 12 or rear 14 shell and/or one or more other feature of the enclosure 10, first end cap 300, and/or PCB 20 is configured to prevent or otherwise inhibit the PCB 20 from moving longitudinally towards the second end of the enclosure 10. In some embodiments, one or more end cap 300 is configured to selectively prevent the PCB 20 from translating laterally and/or vertically and/or from rotating, such as rotating relative to a longitudinal axis of the keyboard enclosure 10.

In some embodiments the front shell 12 defines opposed grooves 126 and the rear shell 14 defines corresponding opposed tongues 146 that are configured for selective engagement with respective grooves 126 of the front shell 12. In this way, the keyboard enclosure 10 is moveable from a disassembled configuration to an assembled configuration by inserting a first end of the tongues 146 into a second end of the grooves 126 and moveable between an open configuration and a closed configuration by sliding the front 12 and rear 14 shells relative to each other. In some such embodiments, the shells are configured to slide relative to each other while a PCB 20 is positioned therebetween, thereby allowing for selectively enclosing the PCB 20 within the interior cavity 200 of the keyboard enclosure 10 and/or selectively removing the PCB 20 from the interior cavity 200 of the keyboard enclosure 10. It will be appreciated that in other embodiments the front shell 12 defines opposed tongues and the rear shell defines opposed grooves and/or the front 12 and/or rear 14 shells define other corresponding features for facilitating selective engagement of the front 12 and rear 14 shells. In some such embodiments, the closed configuration of the enclosure 10 defines one or more open end, one or more such open end being configured to receive an end cap 300. In other such embodiments, moving the enclosure 10 to the closed configuration includes moving a first end of the rear shell 14 into selective engagement with a first end cap 300 secured to a first end of the front shell 12 and/or moving a second end of the front shell 12 into selective engagement with a second end cap 300 secured to a second end of the rear shell 14.

In some embodiments, at least one end cap 300 is a cable end cap defining a slot for selectively receiving a cable, thereby allowing the cable to extend into the interior cavity 200 of the keyboard enclosure 10. In this way, the PCB 20 is capable of being in electrical and/or data communication with an outside source, such as a power grid and/or a computer system. In some embodiments, the cable end cap defines one or more feature, such as an S-channel, for selectively securing the cable, thereby preventing or otherwise inhibiting the cable from disconnecting from the PCB 20 and/or otherwise damaging the PCB. In some embodiments, the cable end cap defines a large void for receiving one or more loop of the cable, thereby providing slack so as to eliminate or otherwise reduce risk of damage to the PCB 20 and/or disconnection of the cable from the PCB 20.

In some embodiments, the PCB 20 is capable of wireless data communication with one or more data source, thereby eliminating the need for a data cable. In some such embodiments, the PCB 20 includes one or more battery terminal, thereby eliminating the need for a power cable. In some embodiments, the PCB is configured such that the enclosure 10 must be in the open or disassembled configuration to remove, install, and/or replace batteries. In other embodiments, one or more end cap 300 is a battery end cap that is configured to receive one or more battery, thereby allowing one or more battery to extend towards the PCB 20 for selective engagement with one or more respective battery terminal. In some embodiments, batteries are removable by removing the battery end cap while the enclosure 10 is in the closed configuration. In some such embodiments, the battery end cap includes a battery door that is moveable from an open configuration and a closed configuration. In the open configuration, the battery door allows one or more battery to be removed from the enclosure 10, installed in the enclosure 10, and/or otherwise replaced. In the closed configuration, the battery door retains the batteries relative to respective battery terminals of the PCB 20, thereby facilitating electrical communication with the PCB 20.

In some embodiments, the battery end cap is configured to selectively engage a first portion of each battery, with a second portion of each battery extending freely from the battery end cap towards respective battery terminals of the PCB 20. In this way, the battery end cap provides sufficient structure to position and align each battery with its respective battery terminal while eliminating or otherwise reducing the risk of one or more battery becoming lodged within the battery end cap. In some such embodiments, the first portion of the battery is two-thirds of the overall length of the battery.

In some embodiments, a front surface of the front shell 12 defines a recessed area 18 that is configured to receive a keypad 30. In some such embodiments, opposed longitudinal edges of the recessed area 18 are configured to interface with opposed longitudinal edges of the keypad 30, thereby preventing or otherwise inhibiting the keypad 30 from translating in a lateral direction when the keypad 30 is positioned in the recessed area 18. In some such embodiments, opposed end caps each define opposed lateral edges of the recessed area, thereby preventing or otherwise inhibiting the keypad 30 from translating in a longitudinal direction within the recessed area 18 when the end caps are engaged with the first shell 12. In other such embodiments, at least one lateral edge of the recessed area 18 is defined by the front shell 12. In some embodiments, a top surface of the keypad 30 is flush with or is slightly offset below non-recessed portion of the front surface of the front shell 12.

Figure 9:
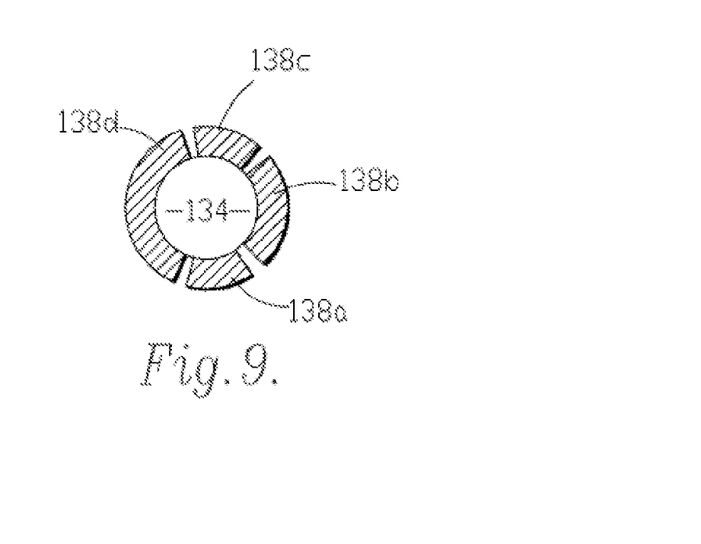
FIG. 9 is a front view of a button for a keypad membrane of one preferred embodiment of the instant invention in which multiple leads of different dimensions are utilized on the front side of each button.
Figures 11, 12:
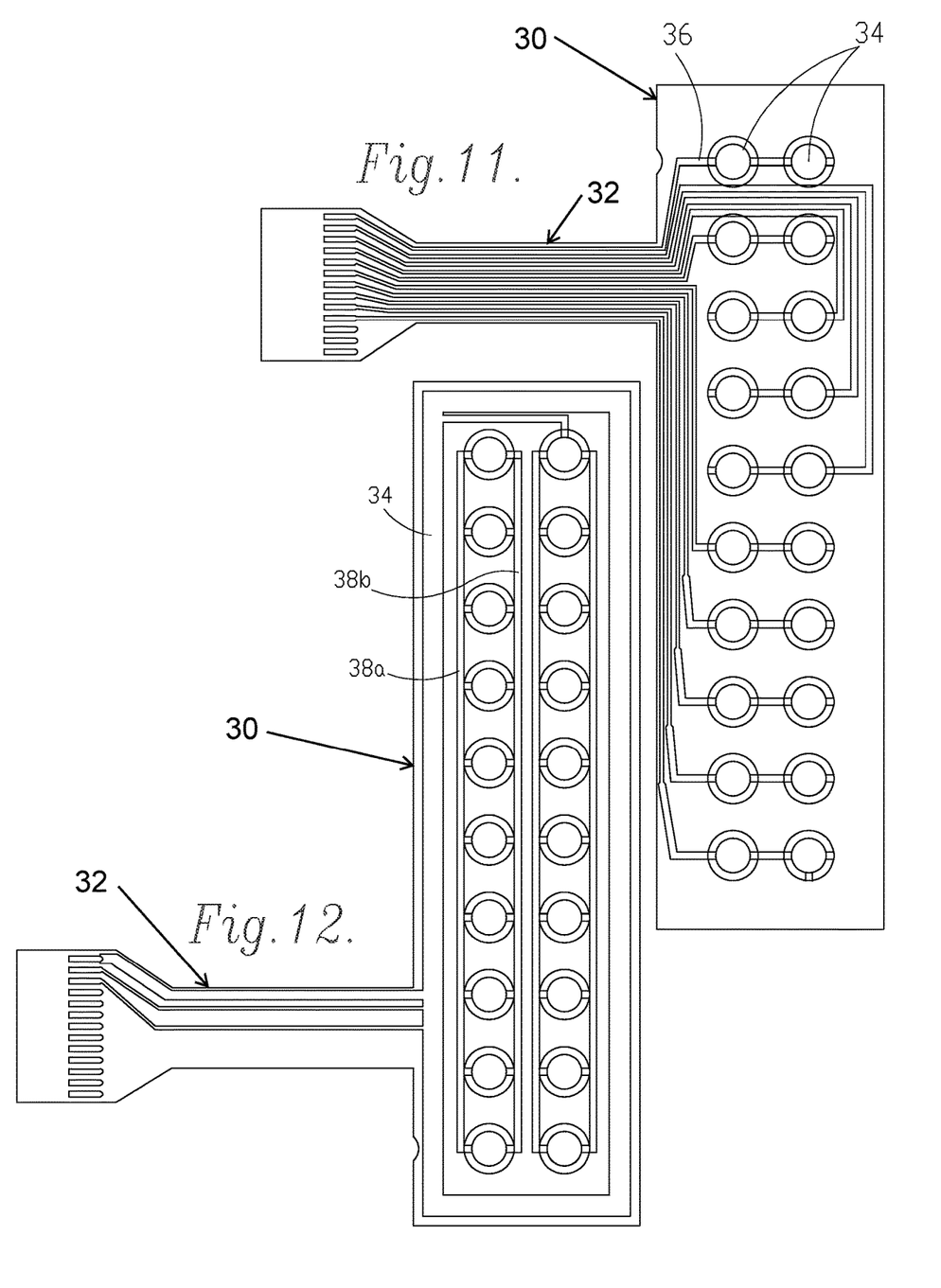
FIGS. 11 and 12 are rear and front, respectively, plan views of a keypad membrane of an embodiment of the instant invention in which two parallel front leads are connected to each button/switch.
Figure 13:
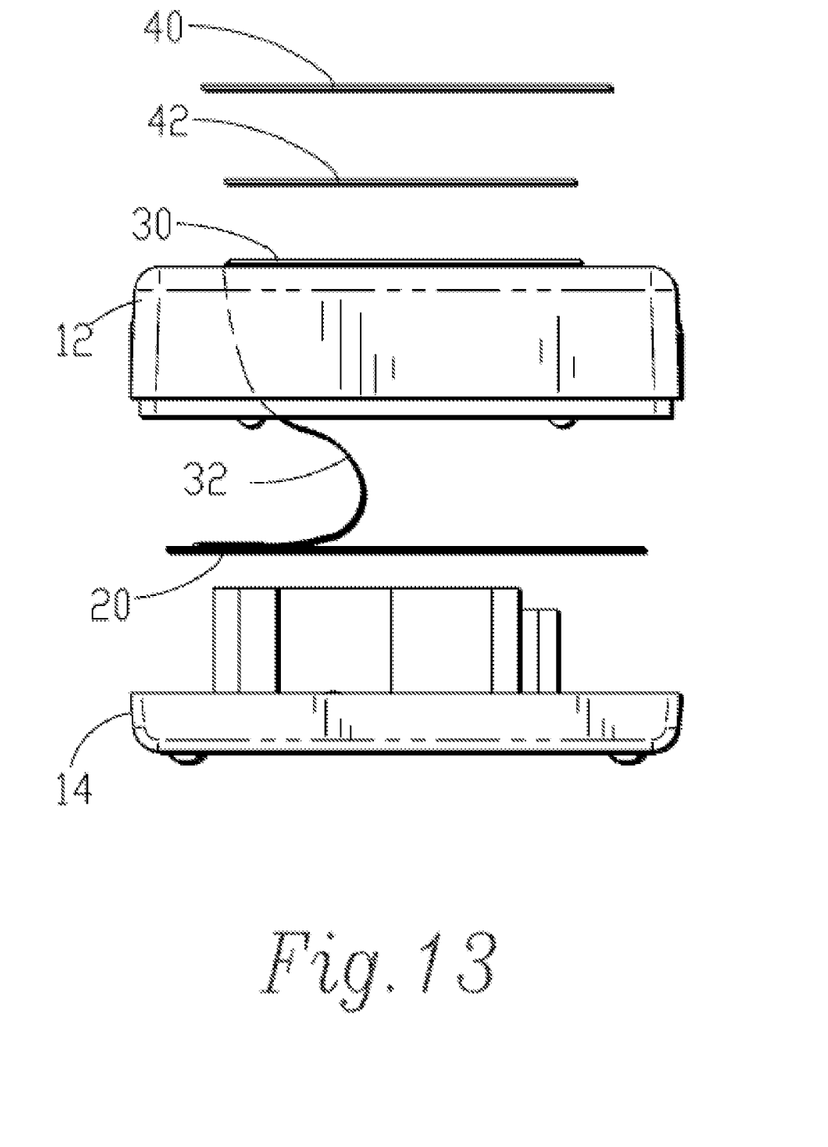
FIG. 13 is an exploded view of an embodiment of the present invention.

In some embodiments, the keypad 30 includes embossed buttons for each key, instead of metal domes. In some embodiments, the buttons are connected together in parallel and each button includes at least two front side leads. FIGS. 11 and 12 show an embodiment of the instant invention that includes two front side leads 38*a* and 38*b* to each button 34. In the embodiment shown in FIGS. 11 and 12, only a single back side lead 36 is connected to each button 34 (see FIG. 11); however it will be appreciated that a plurality of leads may also be connected to the back side without departing from the spirit and scope of the instant invention. Referring to FIG. 9 another embodiment of the instant invention is shown in which four front side leads 138*a*, 138*b*, 138*c* and 138*d* are connected to each button 134. In the embodiment shown in FIG. 9, each front side lead for each button includes connection sections of four varying dimensions to create four different resistances during flexing caused by pressing of the buttons. This results in decreased wear on the connections.

In some embodiments, the keyboard 30 includes twenty (20) distinct keys. In some such embodiments, keys of the twenty-key keyboard are oriented in a 2 by 10 configuration and are in data communication with thirteen (13) distinct pins of a pin header of the PCB 20. In other embodiments, the keyboard 30 includes thirty (30) distinct keys. In some such embodiments, keys of the thirty-key keyboard are oriented in a 3 by 10 configuration and are in data communication with fourteen (14) distinct pins of a pin header of the PCB 20. In some embodiments, the PCB 20 is configured to selectively accommodate a twenty-key or a thirty-key keyboard by selectively accommodating a thirteen-pin or a fourteen-pin receptacle of the keyboard, respectively.

Figure 10:
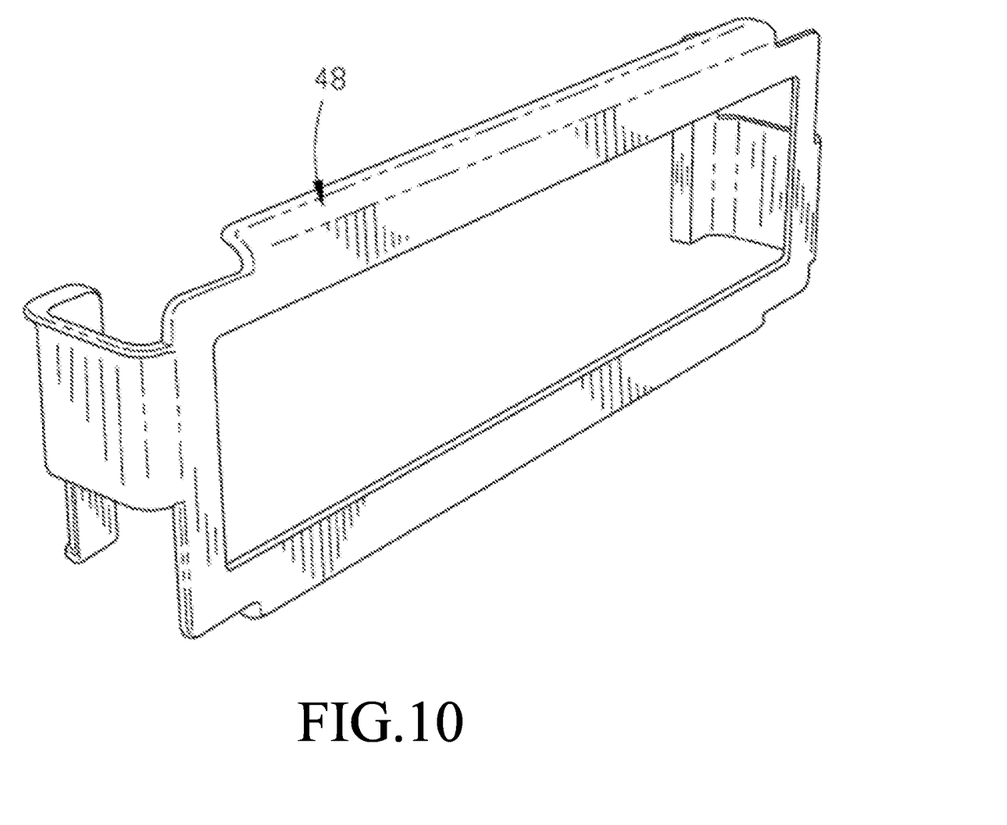
FIG. 10 is a front perspective view of a keypad cover for a keyboard enclosure of an embodiment of the present invention.

In some embodiments, the keypad membrane 30 is covered by a cover membrane 40. In some such embodiments, the cover membrane 40 includes one or more clear window section. The edges of the cover membrane 40 are secured to the front surface of front shell 12 and includes an open slot 45 to allow a keypad card 42 to be moved to (or away from) a first position by inserting (or removing) the keypad card 42 between the rear of the cover membrane 40 and the front of the keypad membrane 30 while the keypad membrane 30 is in a respective first position. In some embodiments, the keyboard is configured to retain the keypad membrane 30 in its first position while one or more keypad card 42 is moved between its first position and a second position. In some embodiments, moving the keypad card 42 to its second position comprises moving the keypad card 42 away from the keyboard, such as by sliding the keypad card 42 through the open slot 45 and away from the keypad membrane 30. In some embodiments, the cover membrane 40 is configured to selectively receive one or more keypad card 42, positioning the keypad card 42 relative to the keypad 30. In some embodiments, the keypad card 42 includes numbers, symbols, words, etc. that associate with the function that is to be performed by the pressing of a key. In one embodiment, a keypad cover 48 (shown in FIG. 10 selectively engages with the keyboard enclosure 10 once the entire enclosure 10, keypad 30, and cover membrane 40 are assembled. In some embodiments, the keypad cover 48 is made of a polymer material that includes enough flexibility to allow the keypad cover 48 to snap around the assembled keyboard enclosure 10. The keypad cover helps to protect the keypad 30 and the keyboard enclosure 10 and also allows the keyboard enclosure 10 to fit within a variety of different mounting brackets, such as those that are commonly used in the restaurant industry.

The present invention further includes methods of assembling a keyboard enclosure 10. In some embodiments, the method includes moving a first longitudinal edge of a PCB 20 into selective engagement with a longitudinal slot 120 of a front shell 12 of the enclosure 10, thereby restraining the PCB 20 in a first degree of translational freedom, a first degree of rotational freedom, and a first direction along a second degree of translational freedom. In some such embodiments, the method further includes positioning an indexing feature of the PCB relative to an indexing feature of the enclosure. In this way, the method includes positioning the PCB along a third degree of translational freedom, thereby providing positional references along each of the three translational degrees of freedom. In some embodiments, the respective indexing features restrain the PCB along the third degree of freedom while the first longitudinal edge of the PCB 20 is engaged with the longitudinal slot 120 of the front shell 12. In other embodiments, one or more other feature, such as one or more feature of the front 12 or rear 14 shell and/or one or more feature of one or more end cap is utilized to position and/or restrain the PCB along the third degree of translational freedom. In some embodiments, the indexing feature is defined by one or more slot 320 defined by one or more end cap 300.

The method further includes installing a rear shell 14 to the front shell 12. In some embodiments, a second longitudinal edge of the PCB 20 is rotated towards a longitudinal ledge 122 of the front shell 12 prior to installing the rear shell 14 to the front shell 12. In some such embodiments, a longitudinal ledge of the rear shell 14 retains the second longitudinal edge of the PCB 20 in close proximity to the longitudinal ledge 122 of the front shell 12, thereby restraining the PCB in a second degree of rotational freedom. In some embodiments, the front 12 and rear 14 shells form a second longitudinal slot between respective longitudinal ledges, thereby restraining the PCB in a second and third degree of rotational freedom and further restraining the PCB in a second direction along the second degree of translational freedom. In other embodiments, one or more end cap 300 engages with one or more end of the PCB 20 so as inhibit or otherwise prevent the PCB 20 from moving relative to the front shell 20 in the first, second, and/or third degrees of translational and/or rotational freedom.

In some embodiments, the method of assembling the keyboard enclosure 10 includes engaging opposed tongues 146 of the rear shell 14 with corresponding opposed grooves 126 of the front shell 12 and sliding the rear shell 14 relative to the front shell 12 until a first end of the rear shell 14 is aligned with a first end of the front shell 12, thereby moving the enclosure 10 to a closed configuration. In some embodiments, a first end cap 300 secured to the first end of the front shell 12 provides a stop for preventing the first end of the rear shell 14 from sliding beyond the first end of the front shell 12. In some embodiments, a first end cap 300 is secured to the rear shell 14, such as with screws extending through a rear wall of the rear shell 14. In other embodiments, a first end cap 300 is secured to the front shell 12, such as with screws extending through a side wall of the front shell 12. In still other embodiments, the first end cap 300 is secured to the front 12 and rear 14 shells, such as with screws extending through respective side walls of the front 12 and rear 14 shells and/or through respective front, side, and/or rear walls of respective shells.

In some embodiments, the method of assembling the keyboard enclosure 10 includes engaging a first end of the rear shell 14 with a second end of the front shell 12 and sliding the shells relative to each other until one or more end of each shell is moved into a predetermined position relative to the other shell, such as by aligning respective first and/or second ends of respective shells. In some embodiments, a second end cap 300 secured to the second end of the rear shell 14 provides a stop for preventing the second end of the front shell 12 from sliding beyond the second end of the rear shell 14. In some such embodiments, the second end cap 300 is secured to the rear shell, such as with screws extending through a rear or side wall of the rear shell 14. In some embodiments, a second end cap 300 is further secured to the front shell 12, such as with screws extending through a front or side wall of the front shell 12, thereby locking the front 12 and rear 14 shells into relative position with each other.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A keyboard moveable between an assembled configuration and a disassembled configuration, the assembled configuration of the keyboard comprising:
   a front shell portion having a first end and an opposed second end;
   a rear shell portion removably connected to said front shell portion so as to form opposed first and second ends of the keyboard and a cavity extending therebetween;
   a circuit board ("PCB") positioned within said cavity, said PCB being displaced from the first end of the keyboard; and
   a first end cap extending from said first end of the keyboard towards said PCB,
   wherein said first end of the keyboard defines a first opening for receiving said first end cap, said first opening being defined at least partially by said first end of said front shell and a first end of said rear shell.

2. The keyboard of claim 1, wherein said front and rear shell portions are made from aluminum.

3. The keyboard of claim 1, further comprising:
   a keypad selectively positioned in a first position over a generally flat and substantially solid front surface of said front shell; and
   a keypad card moveable to a first position over said keypad from a second position displaced from said keypad,
   wherein said keyboard is configured to retain said keypad in its first position while said keypad card is moved between its first and second positions, and
   wherein a front surface of said front shell portion defines a recessed area, said recessed area being configured to receive at least part of said keypad.

4. The keyboard of claim 3, wherein said keypad includes embossed buttons included as part of a unitary keypad membrane.

5. The keyboard of claim 1, further comprising holes extending through an end wall of said first end cap, said holes being associated with a speaker mounted in said cavity.

6. The keyboard of claim 1, wherein an inner surface of said front shell is exposed when the keyboard is in the disassembled configuration, said inner surface defining a first longitudinal slot that is configured to selectively receive a first longitudinal edge of the PCB.

7. The keyboard of claim 6, wherein said inner surface of said front shell further defines a longitudinal ledge opposed to said first longitudinal slot, wherein said front shell is configured to restrain the PCB in at least two degrees of translational freedom and at least two degree of rotational freedom when the second longitudinal edge of the PCB is positioned adjacent to the longitudinal ledge of the front shell.

8. The keyboard of claim 7, wherein an inner surface of said rear shell defines a longitudinal ledge displaced from said longitudinal ledge of said front shell when the keyboard is in the assembled configuration, thereby defining a second longitudinal slot opposed to said first longitudinal slot, wherein said rear shell is configured to further restrain the PCB in a third degree of rotational freedom.

9. The keyboard of claim 8, further comprising an indexing feature for indexing the PCB in a third degree of translational freedom.

10. The keyboard of claim 9, wherein said first end cap comprises a feature for selective engagement with a first end of the PCB, thereby inhibiting the PCB from moving in a first direction along the third degree of translational freedom.

11. The keyboard of claim 10, further comprising a second end cap extending from a second end of said front shell, said second end cap comprising a feature for selective engagement with a second end of the PCB, thereby inhibiting the PCB from moving in a second direction along the third degree of translational freedom, thereby restraining the PCB in the third degree of translational freedom.

12. The keyboard of claim 11, wherein said second end of the keyboard defines a second opening for receiving said second end cap, said second opening being defined at least partially by said second end of said front shell and a second end of said rear shell.

13. The keyboard of claim 12, wherein one of said first and second end caps is longer than the other of said first and second end caps such that the PCB is positioned off-center within said cavity.

14. The keyboard of claim 1, wherein said second end of the keyboard defines a second opening for receiving a second end cap, said second opening being defined at least partially by said second end of said front shell and a second end of said rear shell.

15. The keyboard of claim 14, wherein one of said first and second end caps is longer than the other of said first and second end caps such that the PCB is positioned off-center within said cavity.

16. A method of moving an enclosure from a disassembled configuration to an assembled configuration, the enclosure being configured to hold a circuit board ("PCB") within a cavity of the enclosure, the method comprising:
   engaging the PCB with a front shell of the enclosure while the enclosure is in the disassembled configuration, thereby restraining the PCB in at least one degree of translational freedom, at least one degree of rotational freedom, and at least one direction along a second degree of translational freedom;
   installing a rear shell to the front shell such that the PCB is restrained in the second degree of translational freedom and in a second and third degree of rotational freedom; and
   installing a first end cap to a first end of the front shell such that a distal end of the first end cap engages with a first end of the PCB, thereby inhibiting the PCB from moving in a first direction along a third degree of translational freedom,
   wherein the first end of the enclosure defines a first opening for receiving the first end cap, the first opening being defined at least partially by respective first ends of the front and rear shells.

17. The method of claim 16, wherein an inner surface of the front shell is exposed when the enclosure is in the disassembled configuration, the inner surface defining a first longitudinal slot that is configured to selectively receive a first longitudinal edge of the PCB.

18. The method of claim 17, wherein the inner surface of the front shell further defines a longitudinal ledge opposed to the first longitudinal slot, and wherein an inner surface of the rear shell defines a longitudinal ledge displaced from the longitudinal ledge of the front shell when the enclosure is in the assembled configuration, thereby defining a second longitudinal slot opposed to the first longitudinal slot.

19. The method of claim 16, further comprising installing a second end cap to a second end of the front shell such that a distal end of the second end cap engages with a second end of the PCB, thereby inhibiting the PCB from moving in a second direction along the third degree of translational freedom, wherein the second end of the enclosure defines a second opening for receiving the second end cap, the second opening being defined at least partially by respective second ends of the front and rear shells.

20. The method of claim 19, wherein one of the first and second end caps is longer than the other of said first and second end caps such that the PCB is positioned off-center within the cavity.

* * * * *